INVENTOR.
YASUO FUKUYAMA
BY Kurt Kelman
AGENTS

United States Patent Office 3,453,692
Patented July 8, 1969

3,453,692
MOLD ASSEMBLY FOR MAKING A POLYMER-SLEEVED ROLL
Yasuo Fukuyama, Nishinomiya-shi, Japan, assignor to Yamauchi Rubber Industry Co., Ltd., Osaka-shi, Japan
Filed Oct. 21, 1965, Ser. No. 499,199
Claims priority, application Japan, Dec. 25, 1964, 39/73,176
Int. Cl. F23c 9/02; F27b 1/00; B29c 1/02
U.S. Cl. 18—39                                    3 Claims

ABSTRACT OF THE DISCLOSURE

An elastomeric sleeve is cast on a metal core to produce a printing roll. The annular mold space for the sleeve about the core is formed by two spaced-apart discs mounted coaxially on the cylindrical core and a sheet material wrapped around the discs concentrically about the core. An access opening is provided for the mold space, and the sheet material is held on the discs while the elastomeric sleeve is cast in the mold space.

---

This invention relates to printing rolls and other rolls having a metal core and a sleeve of elastomeric synthetic material, and particularly to a mold assembly for casting an elastomer sleeve on a metal core of a roll.

An object of the invention is the provision of a simple and inexpensive mold assembly for providing roll cores with cylindrical elastomer sleeves of any desired length and diameter.

Another object is the provision of a mold assembly which yields to the expansion and contraction of the elastomer sleeve during curing of the latter on the core so as to avoid inner stresses in the sleeve.

A further object is the provision of a mold assembly which may be stripped from the molded elastomer sleeve in a simple manner without injury to the sleeve, regardless of its size.

Yet another object is the provision of a mold assembly which may be operated with only a fraction of the mold release agents necessary in conventional methods.

Other objects and many of the attendant advantages of this invention will be readily appreciated as the same becomes better understood by reference to the following description of a typical mold of the prior art and of a preferred embodiment of the invention, when considered in connection with the annexed drawing in which.

Figure 1:
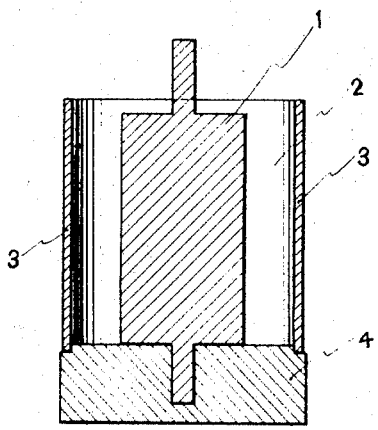
FIG. 1 shows a known mold assembly for preparing an elastomer sleeve for a roll, the view being in elevational section.

Referring initially to FIG. 1, there is shown an assembly commonly employed prior to this invention for forming an elastomer sleeve on a cylindrical metal core 1 provided with integral trunnions. One of the trunnions is received in a conforming recess of a heavy cylindrical base block 4 while the axis of the core is upright.

A length 3 of metal pipe coaxial with the core 1 engages a circumferential groove in the block 4 and is of sufficient axial length to define with the cylindrical face of the core 1 and the top face of the block an upwardly open mold cavity 2 which extends over the entire axial length of the core face.

In using this known mold assembly, the cylindrical core face is coated with a bonding agent while the top face of block 4 and the inner surface of pipe 3 must be coated with a mold release agent. The mold cavity is then filled with a suitable polymerizable composition, and the latter is cured, whereby it is adhered to the cylindrical core face. The pipe 3 and block 4 are stripped from the polymer-sleeved core so formed.

This known arrangement has serious shortcomings which the present invention aims at overcoming. Metal pipe is commercially available only in a limited range of standardized inner diameters. The difference in diameter between adjacent commercially available sizes becomes very substantial in pipes of relatively large diameter, say 8 inches. If a polymer sleeve slightly larger than the internal diameter of standard 8 inch pipe is to be molded, the mold must be made from 10 inch pipe, and the oversized sleeve must be machined to size with a waste of at least one half of the polymer material used. It would be entirely impractical to make large size pipe to order for roll sleeve molds.

The contact area between the metal pipe and the polymer sleeve increases with the diameter and length of the sleeve. If the finished roll is intended to have a diameter of 20 cm. and a length of 100 cm., a popular size in printing rolls, the interface between pipe and sleeve is so large that it becomes difficult, even with the use of a mold release agent, to strip the pipe from the polymer sleeve without damage to the latter.

Most polymerizable mixtures commonly employed in this art expand and contract substantially during curing and solidification. The pipe does not expand and contract in a similar manner even if the volume changes of the polymer composition are of partly thermal origin. The rigid pipe causes internal stresses in the polymer sleeve which may cause cracks during unmolding in extreme cases, and reduce service life even if a product initially free from visible defects is obtained.

It is furthermore difficult to keep the roll free from mold release agent, and to keep the internal pipe wall free from bonding agent. The obvious difficulties arising from any accidental application of either agent where it is not desired increase rapidly with the size of the roll sleeve to be produced, and are quite serious with rolls having final dimensions of 20 cm. diameter and 100 cm. length or larger.

The only solution available so far for some of the problems outlined above was splitting the pipe in an axial plane which somewhat facilitates unmolding, but raises new problems not requiring discussion at this time.

Figure 2:
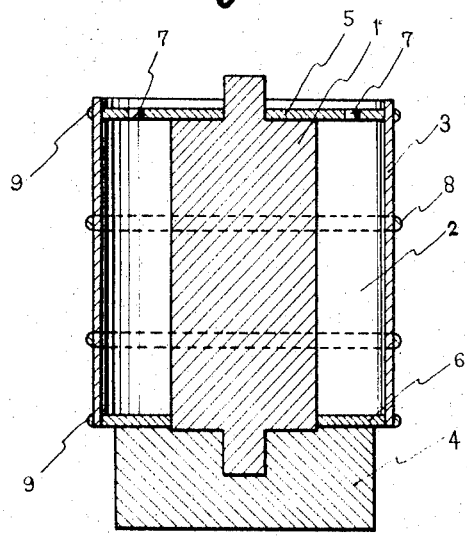
FIG. 2 illustrates a mold assembly of the invention in a view analogous to that of FIG. 1.
Figure 3:
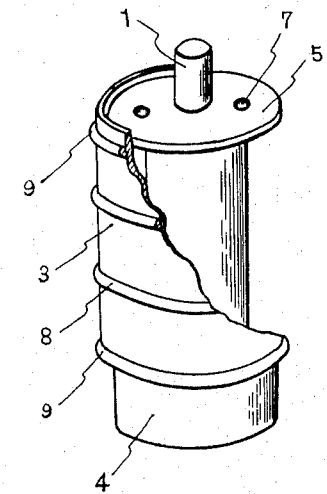
FIG. 3 shows the assembly of FIG. 2 in a perspective view, portions of the device being broken away to reveal inner structure.

I have found that all the above difficulties can be avoided without producing new problems when the mold assembly shown in FIGS. 2 and 3 is used. The metallic roll core 1 is provided with two flat, circular discs 5, 6 of which one is slipped over the upper trunnion in the illustrated upright position of the core 1, whereas the other one circles the axially terminal portion of the roll proper. Either disc position may be employed to suit specific conditions. The discs are coaxially arranged on the core 1. Two axial passages 7 in the upper disc 5 give access to a mold cavity 2 which is radially enclosed between the core 1 and a piece of sheet material 3 wrapped about the circular edges of the discs 5, 6. The core 1 and the disc 6 rest on base block 4.

A flexible or pliable sheet 3 is wrapped about discs 5, 6 in slightly more than one turn so that its circumferentially terminal portions overlap. Hoops 9 on the outside of the sheet 3 are radially aligned with the discs 5, 6 to hold the sheet 3 in position, and external reinforcing ribs 8 are provided to prevent outward bulging of sheet 3 under the weight and/or pressure of a polymer material in the cavity 2.

The selection of materials for discs 5, 6, sheet 3, hoops 9 and ribs 8 will be governed by considerations of size and weight, and by the properties of the polymerizable composition that it is to be poured into cavity 2 through passages 7. The discs 5, 6 may be made of coated cardboard or light sheet metal even when casting sleeves for very large rolls since the discs are not subjected to major stresses.

The sheet 3 may consist of paper, of densely woven fabric, or of light gage plastic which may be wrapped conformingly about the discs 5, 6. The outer diameter of the molding is determined by that of the discs 5, 6 and can be chosen at will. Paper or cloth reinforced with thermosetting synthetic resin, such as phenol-formaldehyde or melamine resin, has been found adequate even for the largest polymer sleeves required by industry, but plastic sheets of polyethylene, polypropylene, polycarbonate, polyvinyl chloride may also be used to advantage because of specific chemical or optical properties.

The hoops 9 may be made of metal but other materials will readily suggest themselves under specific condition of operation. The ribs 8 may consist of the same material as sheet 3, particulary when the latter consists of plastic, but pressure-sensitive adhesive tape has been found a convenient rib material.

In using the afore-described apparatus, the core surface is coated with a bonding agent in a conventional manner, and a mold release agent may be applied to the radial inner faces of the discs 5, 6 but is not always necessary. The discs and core are then assembled and wrapped with the sheet 3, which is ultimately secured and reinforced by hoops 9 and ribs 8.

A liquid polymerizable mixture is poured into the mold cavity 2 and polymerized there. The inexpensive sheet 3 may be torn off for unmolding the product, and the discs 5, 6 are often similarly disposable. The sleeved roll normally requires a finishing operation to give it the precise desired size and surface finish. Machining is usually resorted to for this purpose, and the removal of the sheet 3 is conveniently achieved by such machining.

Woven or other fabric is entirely practical for use with liquid polymerizable compositions of high viscosity but the viscosity of such compositions is never low enough to make leakage from the mold a serious problem.

The manner in which the mold assembly of the invention overcomes the problems inherent in the conventional device shown in FIG. 1 is evident. Some of the sheet materials mentioned above have the added advantage of being transparent, at least when used in the thickness needed here, and to permit visual observation of the mold contents for such sources of difficulties as air and gas bubbles.

The mold assembly shown in FIGS. 2 and 3 is applicable to all casting resin compositions now in practical use although some of the afore-mentioned materials of construction may be more advantageous than others in molding specific compositions. Prepolymer compositions based on epoxy resins, polyester resins, nylon, Thiokol (a polyalkylene sulfide), silicone rubber, and polyurethane have molded successfully.

The following examples are further illustrative of sleeve molding processes that may be carried out in the mold assembly of the invention.

EXAMPLE 1

A polymerizable mixture was made up from commercially available ingredients as follows:

| | Parts |
|---|---|
| Thiokol LP-2 | 50 |
| Thiokol LP-32 | 50 |
| Zinc sulfide | 25 |
| Zinc oxide | 10 |
| Dibutyl phthalate | 40 |

The ingredients were thoroughly mixed on a paint mill, 5. 6 parts cumene hydroperoxide and 1 part tris-(dimethylaminomethyl) - phenol were added last and mixed with the other ingredients on a paint mill to remove gas bubbles. The finished polymerizable mixture has a viscosity of 400 poises at room temperature, and was heated to 40° C. to reduce its viscosity to 200 poises whereupon it was quickly poured into the mold shown in FIGS. 2 and 3, since its pot life is less than two hours.

The wrapping sheet 3 of the mold assembly consisted of polyethylene, and it was reinforced by outer ribs of adhesive-coated cotton tape wrapped about the sheet in multiple layers.

The mixture was cured at 25° C. within 24 hours, and the roll obtained was trimmed on a lathe on which the polyethylene sheet was quickly cut away together with a surface layer of the Thiokol rubber sleeve.

EXAMPLE 2

A printing roll having an outer sleeve of polyurethane rubber was prepared in a manner analogous to the procedure of Example 1 from Adiprene–L–100 (polyether polyurethane prepolymer). The material was heated to 80° C. in a container equipped with a stirrer. When the material reached the desired temperature, the container was evacuated to remove gas bubbles. 4,4-methylene-bis-(2-chlor-aniline) was fused at 110° C. and was added to the hot prepolymer with stirring in an amount of 12%. The catalyzed mixture had a viscosity of 2,000 centipoises.

The sheet material which bounded the mold cavity in a radially outward direction was of polycarbonate, 0.5 mm. thick and transparent. A double layer of the material was used to form the outer mold wall. It was reinforced by ribs made of two layers of the same material and 30 mm. wide. The ribs were cemented into closed loops by means of a solution of the polycarbonate in methylene chloride. The ribs were spaced 30 cm. apart over the axial length of the mold which was 100 cm. The mold contents could be clearly observed through the sheet and even through the ribs.

The metallic core 1 was preheated to 80° C. and coated with a commercial bonding agent (Sixson XAB–199 of Dayton Chemical Corp.) before being assembled with discs 5, 6 and polycarbonate sheets 3 by steel hoops 9. The assembly operation took only a few minutes so that the temperature of the core 1 did not drop appreciably prior to casting. It was carefully synchronized with the preparation of the polymerizable mixture whose pot life is no more than ten minutes.

The viscosity of the casting composition increased rapidly in the mold after pouring so that leakage never was a problem, and the stresses on the sheet 3 caused by the weight of the mixture quickly subsided. The filled mold was kept in an oven at 100° C. to complete curing of the polymer. The mold containing the coated roll was kept at room temperature for a day after removal from the curing oven, and was then trimmed to size on a lathe, the polycarbonate sheet 3 being removed in the initial stage of the machining operation. The discs 5, 6 which had been coated with a mold release agent prior to assembly were readily removed from the mold prior to machining.

EXAMPLE 3

An outer mold wall was prepared from a paper sheet 0.2 mm. thick and impregnated with cured phenol-formaldehyde in the manner described above. It was reinforced with ribs made from strips of the same material. In order to prevent leakage of the fluid casting materials to be employed, the overlapping terminal portions of the paper sheet were cemented to each other by an adhesive based on neoprene.

The prepolymer epoxy resin composition cast in the mold had the following composition:

| | Parts |
|---|---|
| Epikote 871 (epoxyequivalent) | 75 |
| Epikote 828 | 25 |
| Aminoethylpiperazine | 14 |

Epikote is a trade name for commercially available liquid epoxy resin compositions suitable for potting of electronic parts and similar applications. The cured resin produced from the prepolymer was somewhat resilient.

The catalyzed prepolymer mixture had a viscosity of 8 poises after stirring and deaerating, and a pot life of about one hour. It was poured at room temperature, and the filled mold was kept at 100° C. for 5 hours for curing. The molded sleeve obtained was trimmed to size and surfaced on a lathe 25 hours after curing, and the paper shell adhering to the polymer was removed in the same operation.

EXAMPLE 4

A mold was constructed from a roll core and a sheet of transparent polyvinyl chloride, 0.3 mm. thick, in the same manner as in the preceding examples. A commercially available bonding agent which improves the adhesion of silicone rubber to metal was applied to the roll core. Because of the poor adhesion of silicone rubber to all usual materials of construction, the use of a mold release agent was unnecessary, even on discs 5, 6. The polyvinyl chloride sheet was reinforced with clear cellulose tape coated with a presure sensitive adhesive.

A silicone rubber sleeve was formed on the core by polymerization of a silicone prepolymer, commercially available as "Silicon-prepolymer KE–10" (room temperature vulcanized silicon rubber) from Shinetsu Chemical Industry Co. "Catalist RA" (organic metal compound) of the same manufacturer was employed as a curing agent in an amount of 3%. The catalyze mixture was carefully agitated prior to pouring to avoid introduction of air bubbles. The catalyzed polymer mixture was prepared in batches of 500 to 1000 g. which were poured in quick succession. The catalyzed material cured at ambient temperature in about 40 minutes.

The polyvinyl chloride sheet could readily be removed from the cured elastomer sleeve which was then trimmed to its finished size.

What is claimed is:

1. A device for making a polymer sleeve comprising, in combination:
   (a) a roll core having an axis;
   (b) two circular discs coaxially mounted on said core in axially spaced relationship, each disc having a circular edge portion projecting radially beyond said roll core in all directions;
   (c) a piece of pliable sheet material engaging said edge portions and extending therebetween to form a closed cylinder, said piece having two circumferentially terminal portions radially overlapping each other,
      (1) said core, said discs, and said piece jointly constituting the walls of a substantially closed mold space of annular cross section transversely of said axis,
      (2) one of said walls being formed with an access opening therethrough; and
   (d) hoop means extending about said axis in abutting engagement with said piece of sheet material for holding said terminal portions in the overlapping position.

2. A device as set forth in claim 1, wherein said one wall is one of said discs, and said access opening extending axially through said one disc.

3. A device for making a polymer sleeve comprising, in combination:
   (a) a base member having a top face and formed with a recess therein;
   (b) a roll core having an axis and at least one axially projecting trunnion portion, said portion being received in said recess and said axis being upright;
   (c) two annular discs mounted on respective axially terminal portions of said roll core;
      (1) one of said discs abuttingly engaging said top face, and the other disc being spaced from said one disc in an upward direction, and formed with an axial access passage therethrough,
      (2) each disc having a circular edge portion radially projecting beyond said roll core and centered on said axis;
   (d) a piece of flexible sheet material engaging said edge portions and extending therebetween to form a closed cylinder about said axis,
      (1) said piece having two circumferentially terminal portions radially overlapping each other,
      (2) said core, said discs, and said piece jointly constituting the walls of a substantially closed mold space of annular cross section,
      (3) said passage communicating with said space;
   (e) two hoop members respectively radially aligned with said discs and engaging the outer surface of said sheet member for securing the same to said discs; and
   (f) at least one annular closed reinforcing rib axially interposed between said hoop members in abutting engagement with said outer surface.

References Cited

UNITED STATES PATENTS

| | | | |
|---|---|---|---|
| 945,537 | 1/1910 | Hoffmann | 18—39 XR |
| 2,618,037 | 11/1952 | Miller | 249—134 XR |
| 2,694,847 | 11/1954 | Christiansen | 249—134 XR |
| 2,866,251 | 12/1958 | Ford | 249—134 XR |
| 3,026,572 | 3/1962 | Reick | 18—30 XR |
| 3,100,676 | 8/1963 | Christie | 18—29 XR |
| 3,355,772 | 12/1967 | Kolberg | 18—29 XR |

WILLIAM J. STEPHENSON, *Primary Examiner.*

U.S. Cl. X.R.

18—29, 47; 249—97, 134, 173